United States Patent

Corwin et al.

[15] 3,691,792
[45] Sept. 19, 1972

[54] TORSIONALLY RESILIENT DRIVE MECHANISM

[72] Inventors: Howard R. Corwin, North Caldwell; Walter L. Hermes, Cedar Grove; Charles Jones, Hillsdale, all of N.J.

[73] Assignee: Curtiss-Wright Corporation

[22] Filed: May 18, 1971

[21] Appl. No.: 144,544

[52] U.S. Cl. ..................................................64/31
[51] Int. Cl. ..................................................F16d 3/04
[58] Field of Search..................................64/31, 27

[56] References Cited

UNITED STATES PATENTS 2,343,244   3/1944   Rose.............................64/31
2,733,580   2/1956   Miller........................64/31 X
3,407,628   10/1968  Eccher..........................64/31

*Primary Examiner*—Edward G. Favors
*Attorney*—Raymond P. Wallace and Victor D. Behn

[57] ABSTRACT

A drive mechanism between the output shaft of an engine and a parallel drive shaft, comprising a vibrationally tuned torsional system with reducing gearing resiliently coupled to the driven shaft to reduce shock load on the gear teeth and smooth out any sinusoidal component in power output from the engine, and to absorb acceleration and gyroscopic forces from the driven shaft and separation forces on the gears.

8 Claims, 3 Drawing Figures

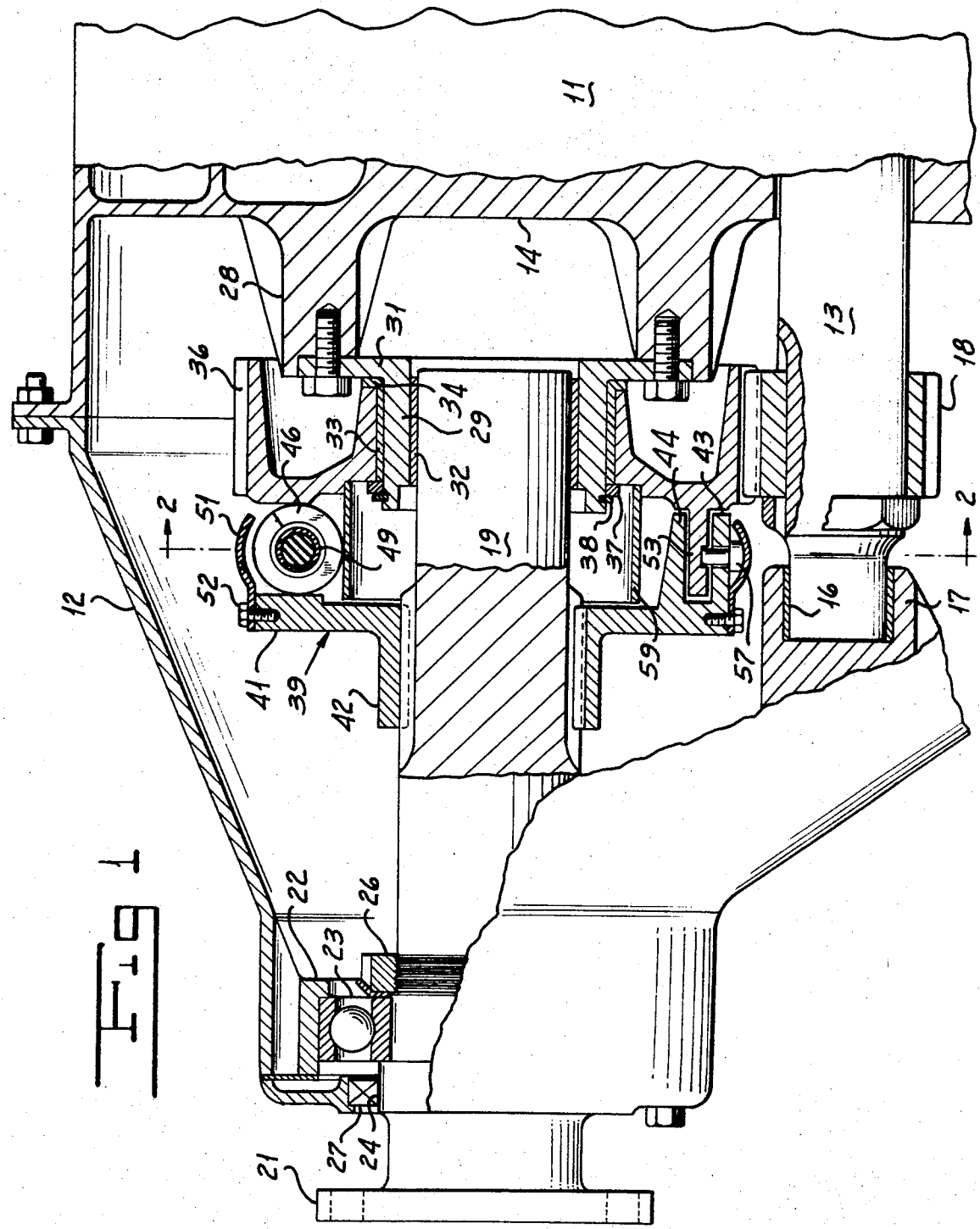

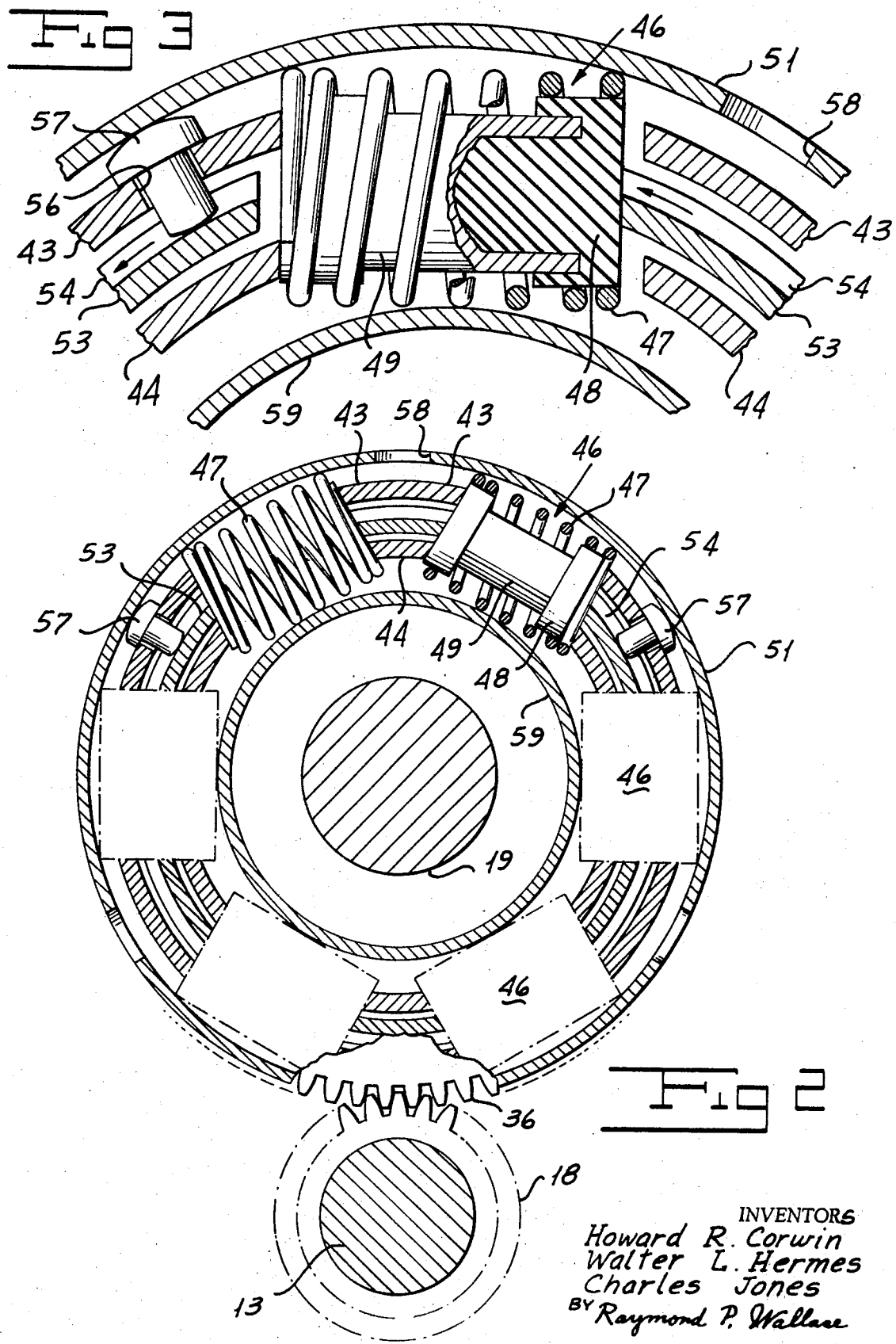

3,691,792

TORSIONALLY RESILIENT DRIVE MECHANISM

BACKGROUND OF THE INVENTION

This invention relates to a positive drive mechanism between two shafts, with provision for tuned torsional resiliency therein.

Torsionally resilient couplings are known for coaxial shafts, or for shafts in which the intended coaxial alignment is not perfect, as in U.S. Pats. Nos. 2,127,996 and 3,159,987. In those devices, however, the power transmission is from one shaft to another turning on the same axis, at the same speed, and without the necessity for accommodating differential thrusts of the two shafts. The mechanisms are for relatively light loads, and the spring members utilized for the yieldable elements are loosely mounted and subject to chafing and frictional wear.

SUMMARY

The present invention provides a speed reducing mechanism between the output shaft of an engine, wherein the output torque may be somewhat sinusoidal or pulsed, and a driven shaft. It includes a resilient coupling mechanism with tuned composite yieldable elements which are arranged to obviate frictional wear and to provide damping of oscillation, and a concentric bearing structure with independently acting bearings which control gyroscopic precessional forces from the driven shaft, and radial and thrust loads on the gearing, with provision for isolating differential thrusts. The torsional resilience of the yieldable elements is selected in consonance with the system inertia and other flexible elements, so that no torsional resonance mode, which might be excited by engine firing impulses, exists in the normal operating range of the engine.

It is therefore an object of this invention to provide a speed reducing means which smooths the output torque from an engine and cushions shock loads on the gear teeth.

It is another object to provide a speed reducing mechanism having tuned torsional resiliency and a fail-safe arrangement.

A further object is to provide such a device wherein the yieldable elements are not subject to high frictional wear.

Other objects and advantages will be apparent on reading the following specification in connection with the annexed drawings.

BRIEF DESCRIPTION OF THE DRAWINGS

FIG. 1 is an axial cross-section in elevation of the combination of the invention;

FIG. 2 is a cross-section taken on line 2—2 of FIG. 1; and

FIG. 3 is a fragmentary enlarged view of one of the composite yieldable elements of the resilient coupling, shown under load.

DESCRIPTION OF THE PREFERRED EMBODIMENT

In FIG. 1 there is shown the output end 11 of an engine, which may be of rotary or other type. Extending from the end of the engine is a housing member 12 which encloses the drive mechanism described below. An output shaft 13 extends through the engine wall and has its outboard end journalled in a bearing 16 borne by a bearing support member 17 carried by the housing. A pinion drive gear 18 is splined, keyed, or otherwise securely mounted on the outboard portion of the shaft. The driven shaft of the combination may be of whatever nature required. It will be herein described as a propellershaft by way of example, but is not limited to a propellershaft.

A propellershaft 19 extends through the forward portion of housing 12, its outboard end bearing a mounting flange 21 for a propeller. The housing carries a bearing support member 22 positioning a bearing 23 for the forward end of the propellershaft, which is provided with a thrust shoulder portion 24 seated against the bearing and held thereto by a locknut 26 on the opposite side. A gasket 27 is positioned around the shaft at the front end to seal against oil leakage and prevent entry of foreign particles.

Extending forwardly from the front wall of the engine are support bosses 28 which hold and position a bearing support. The bearing support comprises a cylindrical barrel 29 having an external flange 31, the flange being mounted on the bosses by bolts, dowels, or other suitable means. The inside of barrel 29 holds a sleeve bearing 32 in which the aft end of the propellershaft 19 is journalled. Surrounding the outside of the support barrel is a sleeve bearing 33 having a thrust flange 34 seated against flange 31 of the bearing support. A reducing gear 36, in mesh with drive pinion 18, is positioned on the flanged sleeve bearing 33 against the thrust flange 34, and held thereon at the opposite end by a thrust collar 37 against the gear hub, the collar being retained by a snap ring 38 or other convenient means.

A resilient coupling member 39 is mounted on propellershaft 19 forward of the reducing gear 36. The coupling includes a disk-like member 41 having a hub 42 which surrounds the propellershaft and is secured thereto by splines or keys or other appropriate means allowing at least a slight axial movement. The coupling 39 floats axially on the propellershaft, being restrained from any large axial movement, however, by means to be described.

In FIGS. 2 and 3 there is shown a cross-section through coupling 39. Extending rearwardly from the aft face of disk 41 are a pair of coaxial interrupted annuli, which being interrupted circumferentially at a plurality of locations comprise an outer circle of arcuate fingers 43 and an inner circle of arcuate fingers 44. Each associated pair of outer and inner fingers 43 and 44 has flat ends lying on a chordal plane, and the chordal distance between pairs of fingers around the circumference of the coupling is equal, so that the interruptions comprise a plurality of notches across the two annuli, forming a plurality of rectangular recesses disposed around the disk member. It is to be understood that the method of producing the fingers by machining away portions of two annuli is for fabrication convenience, and that the fingers need not necessarily be produced in this manner. It is only necessary that the fingers define recesses having plane, parallel ends. Six such recesses are shown by way of example, but there may be more or less, depending on the design load and the available space.

In each such recess is disposed a yieldable element 46. The yieldable element may be a helical spring 47 with closed and squared ends, but preferably includes a damper core member positioned within the inner diameter of the spring. The core member comprises a generally cylindrical portion 48 of rubber or other elastomer of which at least the ends are of sufficient diameter to be in thigh frictional engagement with the inner diameter of the spring, and a metal tube 49 of less length and smaller diameter than the spring, with the rubber portion extending through the tube and capping the ends thereof so that the tube ends are not exposed. Spring 47 is of such length that it is under at least some degree of compression when installed in the recess between the abutting faces of fingers 43 and 44, with the finger ends abutting firmly against the squared ends of the spring.

The spring rate of elements 46, as well as the degree of initial compression, are selected according to the design load and the degree of resiliency required with regard to the inertias of the various elements of the system, as well as their torsional or other flexibilities, so that no resonant modes can develop from these causes.

The core members are somewhat shorter than the spring in its installed position, so that no more than one end of the damper is in contact with the finger ends when the coupling is not under load. This aspect is shown in FIG. 2, with the spacing between the end of the core and the fingers somewhat exaggerated.

An outer retainer 51 is provided for the yieldable elements, comprising a ring having a partial toric cross-section of which the curvature is congruent to the outer diameter of the springs. At their ends the springs are in contact with the inner surface of the retainer so that they are restrained from any movement which might be imparted by centrifugal force. The retainer is secured to disk 41 by screws 52.

The reduction gear 36 has projecting from its forward face an interrupted annulus similar to those of the coupling and forming a plurality of arcuate fingers 53. The diameter and dimensions of the interrupted annulus of the gear are such that the fingers 53 extend forwardly and nest between the pairs of associated fingers 43 and 44 of the coupling, and the chordal spacing between the ends of fingers 53 is the same as the length of the recess formed by the coupling fingers, so that the ends of fingers 53 are in contact with the ends of the yieldable elements 46. The ends of fingers 53 have plane faces of substantial extent, flat against the ends of the squared springs and with the centerline of the finger ends registered approximately across the diameter of the spring, so that when pressure is applied by fingers 53 the springs will compress axially without bending sidewise.

The annulus from which fingers 53 are formed is provided with an annular groove 54 in its outer surface, and a plurality of fingers 43 of the coupling have radial bores 56 therethrough, in which are disposed button-headed pins 57 with their inner ends extending into groove 54 and their heads retained by the ring 51. To assembly this combination, retainer ring 51 is provided with one or more holes 58 therethrough, through which the pins can be inserted into position in bores 56, the ring 51 then being rotated until no pin is in register with the hole before the ring is screwed to disk 41.

An inner retainer 59 for the yieldable elements comprises a hollow cylindrical member surrounding shaft 19 and extending forwardly from gear 36, press-fitted into a recess in the forward face of the gear, or welded or otherwise attached. The outer diameter of ring 59 is such that its circumference is in contact with springs 47, at least during the rest condition.

In operation the pinion gear 18 on the engine shaft drives reduction gear 36, which through fingers 53 pressing circumferentially against the yieldable elements 46 resiliently drives the coupling member and the propellershaft on which it is mounted. The yieldable elements 46, as well as being tuned to eliminate resonance modes, have a spring rate such as to take up any ordinary starting shocks or decelerations. If sufficient compression of the yieldable elements occurs, fingers 53 of the gear will reach the surface of the rubber 48 of the damper core, which then adds further resistance if compression is increased. The tubular metal portion 49 of the damper has sufficient strength to carry any anticipated load in the event of failure of any of the yieldable elements, such as breakage of a spring. The tight frictional engagement of the rubber with the inner diameter of the spring provides a damping action against spring oscillation. The loaded condition of a yieldable element is shown in FIG. 3, wherein the spring is depicted as compressed by a finger 53 to the point where the spring is shortened to the length of the damper core.

The positioning of the yieldable members in slots having plane and parallel ends, with the springs also having plane and parallel ends always in contact with the slots whether in the loaded or unloaded state, retains the yieldable elements in constant radial position so that there is no relative sliding of the loaded ends of the spring against the slot ends, thus eliminating undue wear.

Although both the propellershaft and the reducing gear are provided with thrust bearing members, there may still be small axial movements, differing between the two shafts, owing to manufacturing tolerances and bearing clearances, and these differing movements must not be tied together. For this reason the coupling 39 is allowed to float axially on the propellershaft, but its axial movement is restrained to only the amount of clearance between the diameter of pins 57 and the width of the groove 54 into which they extend (shown in FIG. 1), plus the clearance between the pins and the holes in fingers 43 through which they extend. These clearances are exaggerated in the drawings, and need only be some thousandths of an inch in sum. There is no axial load on pins 57, since the coupling 39 is not subject to thrust.

Bearing 32 at the aft end of the propellershaft bears the load of any moment in the plane of the shaft, such as precession of the axis of the propellershaft arising from gyroscopic forces. Bearing 33 takes the thrust of the reducing gear and also the wedging forces between the pinion and the reducing gear which tend to separate them. Although the two bearings are concentric their loads are not summative, owing to the intervention between them of the solidly mounted bearing support 39.

What is claimed is:

1. Torsionally resilient means for transmitting rotary motion from one shaft to another, comprising in combination a power shaft, a driven shaft on an axis parallel thereto but displaced therefrom, a coupling member mounted on the driven shaft in driving relation thereto and coaxial therewith, the coupling having a disk-like portion having a plurality of fingers projecting in the axial direction from one face thereof and defining a plurality of recesses circumferentially disposed, a resiliently yieldable element having parallel plane ends disposed in each of the recesses, a rotatable transmission element coaxial with the driven shaft and having a plurality of fingers projecting in the axial direction therefrom and in contact with the plane end of the yieldable elements, the transmission element being driven by the power shaft, so that on rotation of the transmission element the fingers thereof apply compressive force to one end of the yieldable elements and thereby impart rotation to the driven shaft.

2. The combination recited in claim 1, wherein there is provided a rigidly mounted generally cylindrical bearing support having inner and outer diameters, an inner sleeve bearing is disposed within the inner diameter of the bearing support and one end of the driven shaft is journalled in the inner bearing, an outer sleeve bearing is disposed around the outer diameter of the bearing support, the transmission element is a reduction gear having an axial bore therethrough, the reduction gear being mounted on the outer sleeve bearing, and the power shaft bears a pinion gear in mesh with the reduction gear.

3. The combination recited in claim 2, wherein the coupling member is movable in the axial direction on the driven shaft.

4. The combination recited in claim 3, wherein the driven shaft is provided with thrust bearing means, the reduction gear is provided with thrust bearing means independent of the shaft thrust bearing means, and differential axial movements of the shaft and gear due to thrust loads are isolated by the axially movable coupling member.

5. The combination recited in claim 4, wherein each yieldable element is a composite member comprising a helical spring having closed and squared ends, and a damper core positioned within the inner diameter thereof, the damper core comprising a metal tube filled with elastomer and having its ends covered by the elastomer, the elastomer being in tight frictional engagement with the inner diameter of the spring at the ends of the damper core.

6. The combination recited in claim 5, wherein the yieldable elements positioned in the recesses of the coupling member are under compression during the rest condition, the the coupling is provided with inner and outer retainers which restrain the yieldable elements from any radial movement.

7. The combination recited in claim 6, wherein the fingers of the reduction gear have flat end faces of substantial width abutting the flat ends of the yieldable elements, the centerline of the finger ends being registered approximately across the diameter of the yieldable elements, so that compressive force is applied by the fingers approximately along the axis of the yieldable elements.

8. The combination recited in claim 4, wherein the fingers of the reduction gear are provided with a circumferential groove on their outermost surface, and a plurality of the outermost fingers of the coupling member bear pins projecting radially inwardly and having their inner ends extending into the grooves to couple the gear and the coupling member together in the axial direction, there being sufficient clearance between the diameter of the pins and the axial width of the grooves to permit slight axial movement of the coupling member on the driven shaft.

* * * * *